United States Patent [19]
Jansen et al.

[11] Patent Number: 5,795,556
[45] Date of Patent: *Aug. 18, 1998

[54] XEROGELS AND PROCESS FOR THEIR PREPARATION

[75] Inventors: Rolf-Michael Jansen, Kelkheim;
Andreas Zimmermann, Griesheim,
both of Germany; Eric Jacquinot,
Trolsy Breuil, France; Douglas Smith,
Albuquerque, N. Mex.

[73] Assignee: Hoechst AG, Germany

[*] Notice: The term of this patent shall not extend beyond the expiration date of Pat. No. 5,647,962.

[21] Appl. No.: 668,458

[22] Filed: Jun. 20, 1996

Related U.S. Application Data

[63] Continuation-in-part of Ser. No. 355,601, Dec. 14, 1994, abandoned.

[30] Foreign Application Priority Data

Dec. 14, 1993 [DE] Germany .................. 43 42 548.8

[51] Int. Cl.$^6$ .................................................. C01B 33/12
[52] U.S. Cl. .................................................. 423/338
[58] Field of Search .................................. 423/338

[56] References Cited

U.S. PATENT DOCUMENTS

| | | | |
|---|---|---|---|
| 3,652,215 | 3/1972 | Aboutboul et al. | 423/338 |
| 3,652,216 | 3/1972 | Krekeler et al. | 423/338 |
| 3,794,713 | 2/1974 | Aboutboul et al. | 423/338 |
| 3,819,811 | 6/1974 | Aboutboul et al. | 423/338 |
| 4,943,425 | 7/1990 | Su et al. | 423/338 |
| 5,647,962 | 7/1997 | Jansen et al. | 423/338 |

FOREIGN PATENT DOCUMENTS

| | | | |
|---|---|---|---|
| 3-008710 | 1/1991 | Japan | 423/338 |
| 682574 | 11/1952 | United Kingdom . | |

*Primary Examiner*—Steven Bos

[57] ABSTRACT

Xerogels and a process for their preparation involving acidifying an aqueous waterglass solution, polycondensing the resulting silica by addition of a base, removing most of the water from the gel by washing the gel with an organic solvent, reacting the resulting gel with a silylation agent and then drying the silylated gel under subcritical conditions.

15 Claims, No Drawings

XEROGELS AND PROCESS FOR THEIR PREPARATION

This application is a continuation-in-part of application Ser. No. 08/355,601 filed Dec. 14, 1994, now abandoned.

The invention relates to a process for the preparation of modified $SiO_2$ gels, referred to below as "xerogels", and the xerogels themselves prepared in this manner.

The xerogels prepared are related to the conventional $SiO_2$ aerogels, but are not identical to them.

$SiO_2$ aerogels are known to have an outstanding insulating effect. They are prepared, for example, by acidic hydrolysis of tetraethylorthosilicate in ethanol. The hydrolysis gives a gel whose structure is determined by the temperature, the pH and the duration of the gelling process. However, the gel structure generally collapses during drying of the wet gels since the capillary forces occurring during drying are extremely strong. The collapse of the gel can be prevented by carrying out the drying at above the critical temperature and the critical pressure of the solvent. Since the liquid/gaseous phase boundary disappears in this range, the capillary forces, too, are absent and the gel does not change during drying, i.e. there is also no shrinkage of the gel during drying. Preparation processes based on this drying technique are known, for example from EP-A-0 396 076 or WO 92/03378. However, for example with the use of ethanol, this technique requires a temperature above 240° C. and pressures above 40 bar. Although replacement of ethanol by $CO_2$ prior to drying reduces the drying temperature to about 40° C., the required pressure is then 80 bar.

It has now been found that $SiO_2$ gels can be dried under subcritical conditions (i.e. during drying a liquid phase and a gas phase exist) if they are reacted with a silylation agent prior to drying. The products obtained are referred to below as "xerogels". They are outstanding heat insulation materials.

The invention relates to a process for the preparation of xerogels which comprises a) bringing an aqueous waterglass solution to a pH of $\leq 3.0$, preferably $\leq 2.2$, with the aid of an acidic ion exchange resin or a mineral acid, b) polycondensing the resulting silica by adding a base to give an $SiO_2$ gel and, if a mineral acid was used in step a), washing the gel electrolyte-free with water, c) washing the gel obtained in step b) with an organic solvent until the water content of the gel is $\leq 5\%$ by weight, d) reacting the gel obtained in step c) with a silylation agent and e) drying the silylated gel obtained in step d) under subcritical conditions.

An acidic ion exchange resin is preferably used in step a); particularly suitable ones are those which contain sulfo groups. If mineral acids are used, hydrochloric acid and sulfuric acid are particularly useful. The waterglass used is in general sodium waterglass or potassium waterglass.

The base used in step b) is in general $NH_4OH$, NaOH, KOH, $Al(OH)_3$ or colloidal silica. If a mineral acid was used in step a), the $SiO_2$ gel produced with the aid of the base is washed electrolyte-free with water; washing is preferably continued until the outflowing washwater has the same electrical conductivity as demineralized water. Before step c) the gel is preferably allowed to age, in general at 20° to 100° C., preferably at 40° to 90° C., and at a pH of 4 to 11, preferably 5 to 9, especially preferred 5 to 8. The time required for this purpose is in general from 1 second to 48 hours, preferably 1 second to 24 hours and especially preferred 1 second to 5 hours.

In step c), the gel is preferably washed with an organic solvent until the water content of the gel is less than 2% by weight. The solvents used are in general aliphatic alcohols, ethers, esters or ketones or aliphatic or aromatic hydrocarbons. Preferred solvents are methanol, ethanol, acetone, tetrahydrofuran, ethyl acetate, dioxane, n-hexane and toluene. Mixtures of the stated solvents may also be used. It is also possible first to wash out the water with an alcohol and then to wash out the latter with a hydrocarbon.

Steps a) to c) are generally carried out at a temperature between the freezing point of the solution and 70° C.

In step d), the solvent-containing gel is reacted with a silylation agent. The silylation agents used are in general silanes of the formulae $R^1_{4-n}SiCl_n$ or $R^1_{4-n}Si(OR^2)_n$ in which $n=1$ to 3, $R^1$ and $R^2$ independently of one another being $C_1$–$C_6$-alkyl, cyclohexyl or phenyl. Silazanes are also suitable. Mono-, di- or trimethylchlorosilane, trimethylmethoxysilane or hexamethyldisilazane is preferably used. The reaction is carried out in general at 20° to 100° C., preferably 30° to 70° C., if necessary in a solvent.

Before step e), the silylated gel is preferably washed with a protic or aprotic solvent until unconverted silylation agent has been substantially removed (residual content $\leq 1\%$ by weight).

Suitable solvents are those stated in step c). In an analogous manner, the solvents stated there as being preferred are also preferred here.

In step e), the gel which has been silylated and preferably washed thereafter is dried preferably at temperatures of $-30°$ to 200° C., especially preferred 0° to 100° C., and pressures of 0.001 to 20 bar, especially preferred 0.01 to 5 bar, in particular 0.1 to 2 bar. The advantage of the process according to the invention is that temperatures and pressures well below the critical temperatures and pressures of the conventional solvents are sufficient during drying. Temperatures higher than 200° C. and/or pressures higher than 20 bar are entirely possible but entail unnecessary expense and have no advantages. The drying is generally continued until the gel has a residual solvent content of less than 0.1% by weight.

The xerogels prepared according to the process of the present invention are silylated, that means that 5 to 70% of the groups of the inner surface comprise

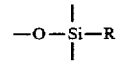

groups, connected with the oxygen atom to the $SiO_2$-network, and the rest of the groups of the inner surface comprise OH-groups.

From the above-said follows, that the xerogels according to the present invention are essentially free of alkoxy-groups.

The xerogels according to the invention preferably have porosities of more than 60% and densities of less than 0.6 $g/cm^3$, especially preferred less than 0.4 $g/cm^3$ and in particular less than 0.2 $g/cm^3$.

The thermal conductivity ($\lambda$-value) of the xerogel particles is preferably less than 150 mW/mK.

The process according to the invention is to be illustrated by means of Examples.

EXAMPLE 1

1 l of a sodium waterglass solution (containing 8% by weight of $SiO_2$ and having an $Na_2O:SiO_2$ ratio of 1:3.3) was stirred together with 0.5 l of an acidic ion exchange resin (styrene/divinylbenzene copolymer having sulfo groups, commercially available under the name ®DUOLITE C20) until the pH of the aqueous solution was 1.5. Thereafter, the ion exchange resin was filtered off and the aqueous solution was adjusted to a pH of 4 with 0.5 molar $NH_4OH$ solution. The gel formed was then aged for 24 hours at 50° C. and the water was then extracted with 3 l of ethanol. The ethanol was extracted with 1.5 l of n-hexane at 50° C. from the gel thus prepared. Thereafter, the hexane-containing gel was silylated with trimethylchlorosilane (TMCS) (0.05 g of TMCS per gram of wet gel) and then washed again with 0.5 l of n-hexane. The drying of the gel was carried out in air (3 hours at 40° C., then 2 hours at 50° C. and 12 hours at 150° C.).

The transparent xerogel thus obtained had a density of 0.13 g/cm³. The specific surface area was 950 m²/g. The λ value was 0.016 W/mK.

EXAMPLE 2

1 l of a sodium waterglass solution (containing 8% by weight of $SiO_2$ and having an $Na_2O:SiO_2$ ratio of 1:3.3) was passed over a jacketed column (length=50 cm, diameter=15 cm) which contained an acidic ion exchange resin (styrene/divinylbenzene copolymer having sulfo groups, commercially available under the name ®DUOLITE C20). The solution flow through the resin within 10 min. The sol flowing out (without $Na^+$-Ions) at the lower end of the column was collected (pH of the sol 2.4). The aqueous solution was adjusted to a pH of 4.7 with 0.5 molar $NH_4OH$ solution. The gel formed was then aged for 3 hours at 80° C. and the water was then extracted with 3 l of acetone. Thereafter the acetone-containing gel was silylated with trimethyl-chlorosilane (TMCS) (5 mol % of TMCS per gram of wet gel) and then washed again with 3 l of acetone. The drying of the gel was carried out in air (3 hours at 40° C., then 2 hours at 50° C. and 12 hours at 150° C.).

The transparent xerogel thus obtained had a density of 0.140 g/cm³. The specific surface area was 600. The λ value was 0.012 W/mK.

EXAMPLE 3

1l of a sodium waterglass solution (containing 7% by weight of $SiO_2$ and having an $Na_2O:SiO_2$ ratio of 1:3.3) was passed over a jacketed column (length=50 cm, diameter=15 cm) which contained an acidic ion exchange resin (styrene/divinylbenzene copolymer having sulfo groups, commercially available under the name ®DUOLITE C20). The solution flow through the resin within 10 min. The sol flowing out (without $Na^+$-Ions) at the lower end of the column was collected (pH of the sol 2.4). The aqueous solution was adjusted to a pH of 4.7 with 0.5 molar $NH_4OH$ solution. The gel formed was then aged for 3 hours at 80° C. and the water was then extracted with 3 l of acetone. Thereafter the acetone-containing gel was silylated with trimethyl-chlorosilane (TMCS) (5 mol % of TMCS per gram of wet gel) and then washed again with 3 l of acetone. The drying of the gel was carried out in air (3 hours at 40° C., then 2 hours at 50° C. and 12 hours at 150° C.).

The transparent xerogel thus obtained had a density of 0.110 g/cm³. The specific surface area was 600. The λ value was 0.016 W/mK.

EXAMPLE 4

1 l of a sodium waterglass solution (containing 9% by weight of $SiO_2$ and having an $Na_2O:SiO_2$ ratio of 1:3.3) was passed over a jacketed column (length=50 cm, diameter=15 cm) which contained an acidic ion exchange resin (styrene/divinylbenzene copolymer having sulfo groups, commercially available under the name ®DUOLITE C20). The solution flow through the resin within 10 min. The sol flowing out (without $Na^+$-Ions) at the lower end of the column was collected (pH of the sol 2.4). The aqueous solution was adjusted to a pH of 4.7 with 0.5 molar $NH_4OH$ solution. The gel formed was then aged for 3 hours at 80° C. and the water was then extracted with 3 l of acetone. Thereafter the acetone-containing gel was silylated with trimethyl-chlorosilane (TMCS) (5 mol % of TMCS per gram of wet gel) and then washed again with 3 l of acetone. The drying of the gel was carried out in air (3 hours at 40° C., then 2 hours at 50° C. and 12 hours at 150° C.).

The transparent xerogel thus obtained had a density of 0.170 g/cm³. The specific surface area was 600. The γ value was 0.018 W/mK.

EXAMPLE 5

1 l of a sodium waterglass solution (containing 8% by weight of $SiO_2$ and having an $Na_2O:SiO_2$ ratio of 1:3.3) was passed over a jacketed column (length=50 cm, diameter=15 cm) which contained an acidic ion exchange resin (styrene/divinylbenzene copolymer having sulfo groups, commercially available under the name ®DUOLITE C20). The solution flow through the resin within 10 min. The sol flowing out (without $Na^+$-Ions) at the lower end of the column was collected (pH of the sol 2.4). The aqueous solution was adjusted to a pH of 5.0 with 0.5 molar $NH_4OH$ solution. The gel formed was then aged for 3 hours at 80° C. and the water was then extracted with 3 l of acetone. Thereafter the acetone-containing gel was silylated with trimethyl-chlorosilane (TMCS) (5 mol % of TMCS per gram of wet gel) and then washed again with 3 l of acetone. The drying of the gel was carried out in air (3 hours at 40° C., then 2 hours at 50° C. and 12 hours at 150° C.).

The transparent xerogel thus obtained had a density of 0.120 g/cm³. The specific surface area was 600. The γ value was 0.016 W/mK.

EXAMPLE 6

1 l of a sodium waterglass solution (containing 8% by weight of $SiO_2$ and having an $Na_2O:SiO_2$ ratio of 1:3.3) was passed over a jacketed column (length=50 cm, diameter 15 cm) which contained an acidic ion exchange resin (styrene/divinylbenzene copolymer having sulfo groups, commercially available under the name ®DUOLITE C20). The solution flow through the resin within 10 min. The sol flowing out (without $Na^+$-Ions) at the lower end of the column was collected (pH of the sol 2.4). The aqueous solution was adjusted to a pH of 5.3 with 0.5 molar $NH_4OH$ solution. The gel formed was then aged for 3 hours at 80° C. and the water was then extracted with 3 l of acetone. Thereafter the acetone-containing gel was silylated with trimethyl-chlorosilane (TMCS) (5 mol % of TMCS per gram of wet gel) and then washed again with 3 l of acetone. The drying of the gel was carried out in air (3 hours at 40° C., then 2 hours at 50° C. and 12 hours at 150° C.).

The transparent xerogel thus obtained had a density of 0.150 g/cm³. The specific surface area was 600. The λ value was 0.018 W/mK.

EXAMPLE 7

1 l of a sodium waterglass solution (containing 8% by weight of $SiO_2$ and having an $Na_2O:SiO_2$ ratio of 1:3.3) was passed over a jacketed column (length=50 cm, diameter=15 cm) which contained an acidic ion exchange resin (styrene/divinylbenzene copolymer having sulfo groups, commercially available under the name ®DUOLITE C20). The solution flow through the resin within 10 min. The sol flowing out (without $Na^+$-Ions) at the lower end of the column was collected (pH of the sol 2.4). The aqueous solution was adjusted to a pH of 4.7 with 0.5 molar $NH_4OH$ solution. From the formed gel water was then extracted with 3 l of acetone. Thereafter the acetone-containing gel was silylated with trimethyl-chlorosilane (TMCS) (5 mol % of TMCS per gram of wet gel) and then washed again with 3 l of acetone. The drying of the gel was carried out in air (3 hours at 40° C., then 2 hours at 50° C. and 12 hours at 150° C.).

The transparent xerogel thus obtained had a density of 0.200 g/cm$^3$. The specific surface area was 600. The λ value was 0.024 W/mK.

EXAMPLE 8

1 l of a sodium waterglass solution (containing 8% by weight of $SiO_2$ and having an $Na_2O:SiO_2$ ratio of 1:3.3) was passed over a jacketed column (length=50 cm, diameter=15 cm) which contained an acidic ion exchange resin (styrene/divinylbenzene copolymer having sulfo groups, commercially available under the name ®DUOLITE C20). The solution flow through the resin within 10 min. The sol flowing out (without $Na^+$-Ions) at the lower end of the column was collected (pH of the sol 2.4). The aqueous solution was adjusted to a pH of 4.7 with 0.5 molar $NH_4OH$ solution. The gel formed was then aged for 1 hour at 80° C. and the water was then extracted with 3 l of acetone. Thereafter the acetone-containing gel was silylated with trimethyl-chlorosilane (TMCS) (5 mol % of TMCS per gram of wet gel) and then washed again with 3 l of acetone. The drying of the gel was carried out in air (3 hours at 40° C., then 2 hours at 50° C. and 12 hours at 150° C.).

The transparent xerogel thus obtained had a density of 0.170 g/cm$^3$. The specific surface area was 600. The λ value was 0.020 W/mK.

EXAMPLE 9

1 l of a sodium waterglass solution (containing 8% by weight of $SiO_2$ and having an $Na_2O:SiO_2$ ratio of 1:3.3) was passed over a jacketed column (length=50 cm, diameter=15 cm) which contained an acidic ion exchange resin (styrene/divinylbenzene copolymer having sulfo groups, commercially available under the name ®DUOLITE C20). The solution flow through the resin within 10 min. The sol flowing out (without $Na^+$-Ions) at the lower end of the column was collected (pH of the sol 2.4). The aqueous solution was adjusted to a pH of 4.7 with 0.5 molar $NH_4OH$ solution. The gel formed was then aged for 5 hours at 80° C. and the water was then extracted with 3 l of acetone. Thereafter the acetone-containing gel was silylated with trimethyl-chlorosilane (TMCS) (5 mol % of TMCS per gram of wet gel) and then washed again with 3 l of acetone. The drying of the gel was carried out in air (3 hours at 40° C., then 2 hours at 50° C. and 12 hours at 150° C.).

The transparent xerogel thus obtained had a density of 0.180 g/cm$^3$. The specific surface area was 600. The λ value was 0.022 W/mK.

We claim:

1. A process for the preparation of a xerogel which
   a) bringing an aqueous waterglass solution to a pH of ≤3.0 by contacting with an acidic ion exchange resin or a mineral acid to form a resulting silica,
   b) polycondensing the resulting silica by adding a base to the resulting slica to form a $SiO_2$ gel and, if in step a) the mineral acid was contacted with said acqueous waterglass solution then the gel is washed electrolyte-free with water,
   c) washing the gel obtained in step b) with an organic solvent until the water content of the gel is ≤5% by weight,
   d) reacting the gel obtained in step c) with a silylation agent to form a silylated gel and
   e) drying the silylated gel obtained in step d) under subcritical conditions.

2. A process as claimed in claim 1, wherein the pH is brought to ≤2.2 in step a).

3. A process as claimed in claim 1, wherein an acidic ion exchange resin is present in step a).

4. A process as claimed in claim 1, wherein $NH_4OH$, NaOH, KOH, $Al(OH)_3$ or colloidal silica is present as the base in step b).

5. A process as claimed in claim 1, wherein the $SiO_2$ gel obtained in step b) is aged at 20° to 100° C. and a pH of 4 to 11 for a duration of 1 second to 48 hours before it is washed in step c).

6. A process as claimed in claim 5, wherein the gel is aged at a pH of from 5 to 9.

7. A process as claimed in claim 5, wherein the duration of aging is 1 second to 24 hours.

8. A process as claimed in claim 1, wherein, in step c), the gel is washed until its water content is ≤2% by weight.

9. A process as claimed in claim 1, wherein the organic solvent in step c) is selected from the group consisting of methanol, ethanol, acetone, tetrahydrofuran, ethyl acetate, dioxane, n-hexane and toluene.

10. A process as claimed in claim 1, wherein the silylation agent in step d) is selected from the group consisting of mono-, di- or trimethylchlorosilane, trimethylmethoxysilane and hexamethyldisilazane.

11. A process as claimed in claim 1, wherein the silylated gel obtained in step d) is washed with a protic or aprotic solvent before it is dried in step e).

12. A process as claimed in claim 1, wherein the silylated gel is dried at -30° to 200° C. in step e).

13. A process as claimed in claim 1, wherein the silylated gel is dried at 0.001 to 20 bar in step e).

14. The process as claimed in claim 12, wherein the silylated gel is dried at 0.001 to 20 bar in step e).

15. The process as claimed in claim 14, wherein the silylated gel is dried at a temperature from 0° to 100° C. and a pressure from 0.1 to 2 bar.

* * * * *